(12) United States Patent
Cupo

(10) Patent No.: US 9,020,026 B2
(45) Date of Patent: Apr. 28, 2015

(54) FREQUENCY DEPENDENT I/Q IMBALANCE COMPENSATION

(75) Inventor: Robert L. Cupo, Eatontown, NJ (US)

(73) Assignee: LGS Innovations LLC, Herndon, VA (US)

( * ) Notice: Subject to any disclaimer, the term of this patent is extended or adjusted under 35 U.S.C. 154(b) by 200 days.

(21) Appl. No.: 12/985,564

(22) Filed: Jan. 6, 2011

(65) Prior Publication Data

US 2012/0177084 A1   Jul. 12, 2012

(51) Int. Cl.
| | | |
|---|---|---|
| H03H 7/30 | (2006.01) | |
| H03H 7/40 | (2006.01) | |
| H03K 5/159 | (2006.01) | |
| H04B 1/30 | (2006.01) | |
| H04L 27/38 | (2006.01) | |

(52) U.S. Cl.
CPC .............. *H04B 1/30* (2013.01); *H04L 27/3863* (2013.01)

(58) Field of Classification Search
CPC .............. H04L 27/01; H04L 25/03038; H04L 2025/0342; H04L 27/2035; H04L 27/2275; H04L 5/06; H04L 25/497; H04L 25/03343; H04L 25/03057; H04L 27/22; H04L 27/2332; H04L 2027/003; H04L 27/2276; H04L 2027/0057; H04L 1/0054; H04L 27/2647; H03D 3/008; H03D 3/009; H04B 1/707; H04B 3/32; H04B 3/23; H04B 1/1027; H04B 1/123; H04B 1/1036; H03M 13/41; H03M 13/4107; H03M 13/6502
USPC ......... 375/235, 284, 285, 346, 329, 279, 340; 455/309, 313, 324
See application file for complete search history.

(56) References Cited

U.S. PATENT DOCUMENTS

| | | |
|---|---|---|
| 5,930,286 A | 7/1999 | Walley |
| 6,307,902 B1 | 10/2001 | Walley |
| 7,061,994 B2 | 6/2006 | Li et al. |
| 7,251,291 B1 | 7/2007 | Dubuc et al. |
| 7,274,750 B1 | 9/2007 | Mueller |
| 7,298,222 B2 | 11/2007 | Rosik et al. |
| 7,567,611 B2 | 7/2009 | Chien |
| 7,573,954 B2 | 8/2009 | Wu et al. |
| 7,643,405 B1 | 1/2010 | Narasimhan |
| 7,746,186 B2 | 6/2010 | Ananthaswamy |
| 8,218,687 B2 * | 7/2012 | Sayers .................... 375/322 |
| 2003/0231726 A1 | 12/2003 | Schuchert et al. |
| 2005/0227642 A1 | 10/2005 | Jensen |
| 2005/0276354 A1 | 12/2005 | Su et al. |
| 2008/0056397 A1 | 3/2008 | Li et al. |
| 2008/0130779 A1 | 6/2008 | Levi et al. |
| 2010/0272208 A1 | 10/2010 | Feigin et al. |

OTHER PUBLICATIONS

Valkama et al., "Advanced Methods for I/Q Imbalance Compensation in Communication Receivers," IEEE Transactions on Signal Processing, vol. 49, No. 10, Oct. 2001, pp. 2335-2344.

Windisch et al., "Blind I/Q Imbalance Parameter Estimation and Compensation in Low-IF Receivers," Proc. 1st International Symposium on Control, Communications and Signal Processing, (ISCCP 2004), Hammamet, Tunisia, Mar. 2004, pp. 75-78.

Rossi et al., "Iterative Least Squares Design of Perfect Reconstruction QMF Banks," IEEE, CCECE 1996, pp. 762-765.

* cited by examiner

*Primary Examiner* — Phuong Phu
(74) *Attorney, Agent, or Firm* — Baker & Hostetler LLP (57) ABSTRACT

A method and system for compensating for frequency dependent phase and amplitude imbalances is provided. A plurality of frequency sub-bands is extracted from a received wideband signal. Each of the plurality of frequency sub-bands is compensated to produce an associated plurality of compensated frequency sub-bands. The compensated sub-bands are summed in order to produce a compensated signal.

16 Claims, 9 Drawing Sheets

FREQUENCY DEPENDENT I/Q IMBALANCE COMPENSATION

ACKNOWLEDGEMENT OF GOVERNMENT SUPPORT

This invention was made with Government support. The Government has certain rights in the invention.

FIELD OF THE INVENTION

The present invention is generally directed to systems and methods to compensate for frequency dependent imbalances and more particularly to compensating for frequency dependent imbalances in direct down-conversion receivers via implementation of compensation algorithms.

BACKGROUND

Direct down-conversion receivers are preferable to dual-downconverting super-heterodyne receivers because direct down-conversion receivers do not require an intermediate frequency filter. Furthermore, direct down-conversion receivers only require one synthesizer. However, direct down-conversion receivers suffer from gain and phase imbalances caused by analog processing, as well as frequency dependent imbalances caused by the various components integral to the function of a direct down-conversion receiver.

SUMMARY

In accordance with an embodiment of the invention, a method and system for compensating for frequency dependent imbalances is provided. A plurality of frequency sub-bands is extracted from a received wideband signal. Each of the plurality of frequency sub-bands is compensated to produce an associated plurality of compensated frequency sub-bands. The compensated sub-bands are summed in order to produce a compensated signal.

In one embodiment, a sub-band coder extracts the plurality of frequency sub-bands from the received wideband signal.

Compensating each of the plurality of frequency sub-bands may include deriving blind signal separation parameters for each of the plurality of frequency sub-bands. An interference component is removed from each of the plurality of frequency sub-bands based on the blind signal separation parameters. The blind signal separation parameters may be derived by an adaptive process or a block estimation algorithm. The compensation techniques do not preclude the use of a calibrating signal as opposed to a strictly blind approach.

The compensation algorithm applied to each of the plurality of frequency sub-bands may be a frequency dependent algorithm or a frequency independent algorithm.

These and other advantages of the embodiments described will be apparent to those of ordinary skill in the art by reference to the following detailed description and the accompanying drawings.

DETAILED DESCRIPTION

Figure 1:
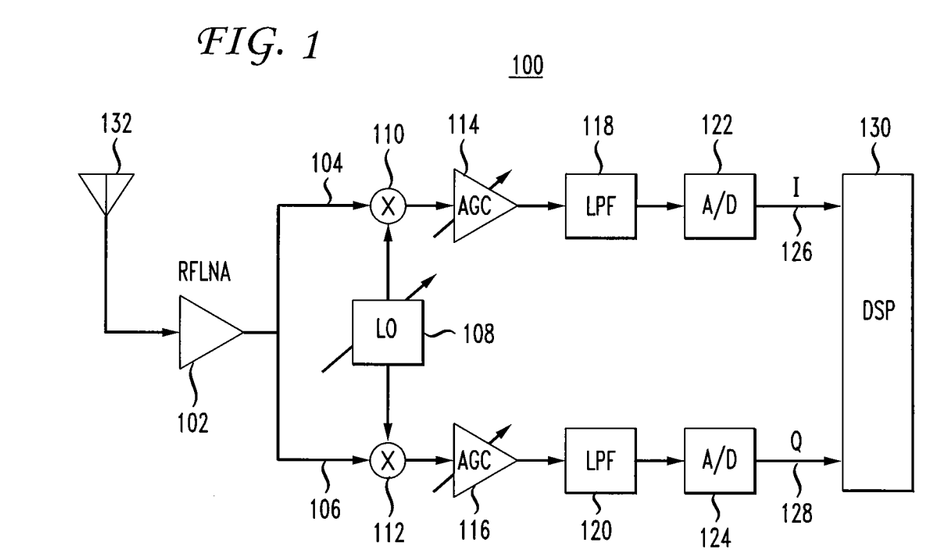
FIG. 1 shows an exemplary direct-down conversion receiver.

FIG. 1 shows an exemplary direct down-conversion receiver 100 that demodulates an input signal by converting the signal into quadrature related baseband signals (I,Q). Direct down-conversion receiver 100 receives a signal centered at a carrier frequency, fc, and converts this signal into a baseband signal centered at zero frequency or at a low intermediate frequency, $f_{if}$, as shown in FIG. 2B. An input signal is received at antenna 132. The signal is processed by radio frequency low noise amplifier (RF LNA) 102 to filter noise from the signal. The filtered signal is sent through an I signal path 104 and a Q signal path 106. Local oscillator (LO) 108 generates output signals that are quadrature mixed with the filtered signals at mixers 110 and 112. Ideally, the LO signals for the I and Q signal paths have equal amplitudes and a phase difference of 90 degrees. The filtered signals are sent through automatic gain control (AGC) circuits 114 and 116 to ensure that the filtered signals remain constant in spite of variations in the input signal strength. The filtered signals are low pass filtered by low pass filters (LPF) 118 and 120, and subsequently converted to digital signals by analog to digital converters (ND) 122 and 124. The output, represented as digital signal I126 and Q 128 can then be processed in a digital signal processor (DSP) 130 to compensate for the image generated.

Ideally, a direct down-conversion receiver such as the one shown in FIG. 1 mixes the I and Q signals and produces a pure translation of the input signal by the local oscillator frequency. However, the gains and phase responses of the I and Q signals are never exactly the same, which causes I/Q imbalances. In general, each of the components of receiver 100 shown in FIG. 1 may contribute an imbalance. As a consequence, the combined effect of each imbalance results in incomplete image attenuation, resulting in an image signal that can potentially interfere with a desired signal.

For example, the demodulation process, started by the local oscillator, may introduce a phase imbalance between the in-phase and quadrature paths of the I and Q signals when phases deviate from 90 degrees. Differences in gain processing between quadrature and in-phase paths are other possible sources of imbalances. The effect of these imbalances results in imperfect demodulation of the originally received signal, which manifests itself by leaving a portion of image energy, otherwise known as an interference signal, after demodulation.

Figure 2A:
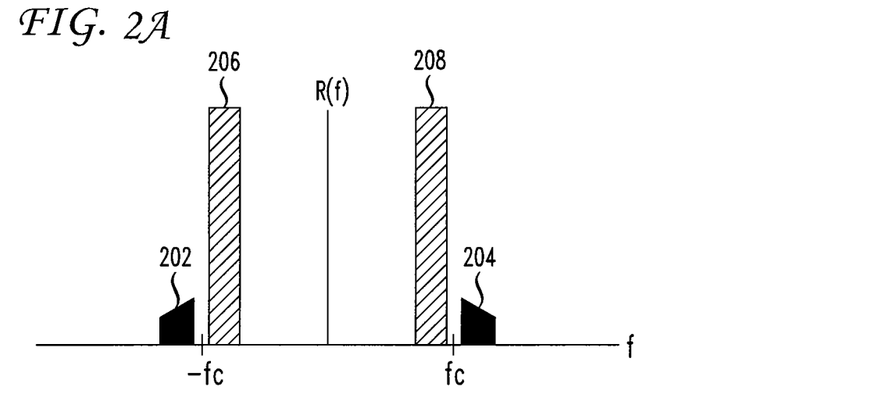
FIG. 2A shows an exemplary passband signal representation of an input signal received by a direct down-conversion receiver.
Figure 2B:
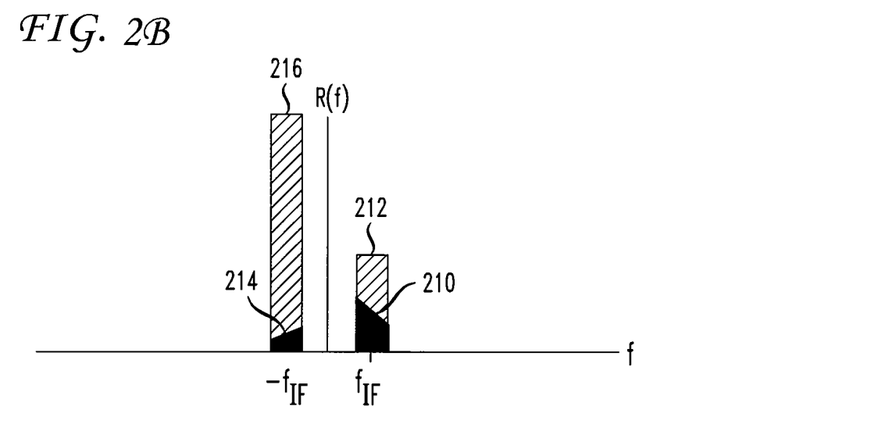
FIG. 2B shows an exemplary representation of an imbalanced baseband signal representation of the input signal shown in FIG. 2A as a result of imperfect demodulation by a direct down-conversion receiver.

FIG. 2A shows an exemplary passband signal centered at fc of an input signal to be received by a direct down-conversion receiver. The direct downconversion receiver will then translate the carrier frequency, fc, to dc. Ideally, the signal 208 will translate to $-f_{IF}$ represented by signal 216 in FIG. 2C. Additionally, signal 204 will translate to $f_{IF}$ represented by signal 210 in FIG. 2C. If the inphase channel (I) and quadrature channel (Q) possess amplitude imbalances and phase imbalances deviating from 90°, the direct downconversion receiver leaves signal content at the image frequency. This signal content may be represented mathematically by demodulating the input signal by the mathematical formula:

$$\cos(w_c t) - j*\rho(f)*\sin(w_c t + \xi(f))$$

as opposed to:

$$\cos(w_c t) - j*\sin(w_c t)$$

where $\rho(f)$ represents the amplitude imbalance as a function of frequency and $\xi(f)$ represents the phase imbalance as a function of frequency.

The former signal may be represented by the mathematical formula:

$$e^{jwct}(1-\rho(f)e^{j\xi(f)})/2 + e^{-jwct}(1+\rho(f)e^{-j\xi(f)})/2.$$

Perfect demodulation can only occur if $\rho(f)=1$ and $\xi(f)=0$ resulting in:

$$e^{jwct}(1-\rho(f)e^{j\xi(f)})/2 + e^{-jwct}(1+\rho(f)e^{-j\xi(f)})/2 = e^{-jwct}$$

This equation shows that any signal centered at $f_c$ that is imperfectly demodulated because of imbalances will include a desired component due to the demodulation using the formula:

$$e^{-jwct}(1+\tau(f)e^{-j\xi(f)})/2$$

and an undesired component due to the demodulation using the formula:

$$e^{jwct}(1-\rho(f)e^{j\xi(f)})/2$$

Figure 2C:
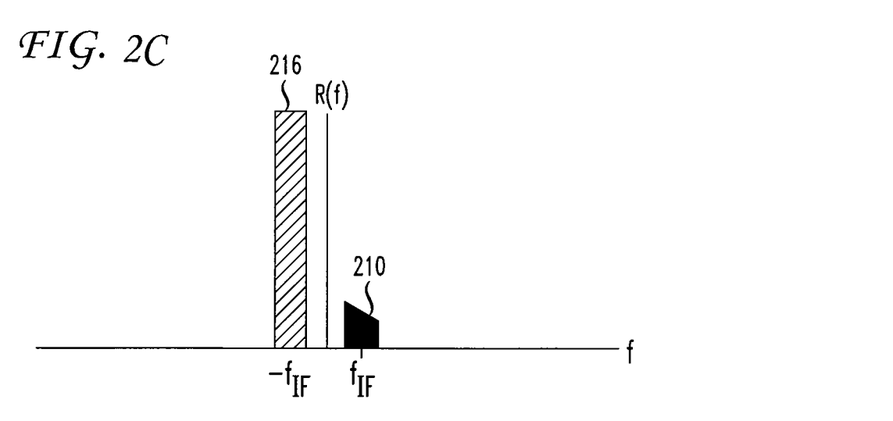
FIG. 2C shows an exemplary representation of a perfectly balanced baseband signal representation of the input signal shown in FIG. 2A.

FIG. 2B shows an exemplary representation of an imbalanced baseband signal of the input signal shown in FIG. 2A as a result of imperfect demodulation by a direct down-conversion receiver. Perfect demodulation would result in no image frequency generation as shown in FIG. 2C. In FIG. 2B, the signals of interest are represented by signals 210 and 216. A signal of interest represents a desired signal that is to be extracted from the input signal. The interference signals are represented by the images of signals 210 and 216. The images of signals 210 and 216 are signals 214 and 212 respectively. Signal 214 is caused by the translation of signal 202 by the formula:

$$e^{jwct}(1-\tau(f)e^{j\xi(f)})/2.$$

Likewise, signal 212 is caused by the translation of the signal 206 by the formula:

$$e^{jwct}(1-\rho(f)e^{j\xi(f)})/2$$

Signal interference represents signals that reduce the detectability of the desired signal. Signal 210 is heavily interfered with by signal 212, which is the image of signal 216, because the amplitude of signal 212 is significantly larger than the amplitude of signal 210. This results in a masking of signal 210, which renders the signal of interest difficult to detect. Note that the desired signal 216 is also interfered with by signal 214, which is the image of signal 210, but because the level of the image is low compared to the signal of interest, signal 216 may remain detectable.

Further problems may arise due to the need for two low pass filters in the exemplary receiver shown in FIG. 1. Since two filters are required, one for each of the I and Q signals, the possibility exists for frequency dependent imbalances. Frequency dependent imbalances are imbalances that change depending on the particular frequency band of the signal. The present invention and the embodiments described herein provide solutions to compensate for frequency dependent imbalances.

Figure 3:
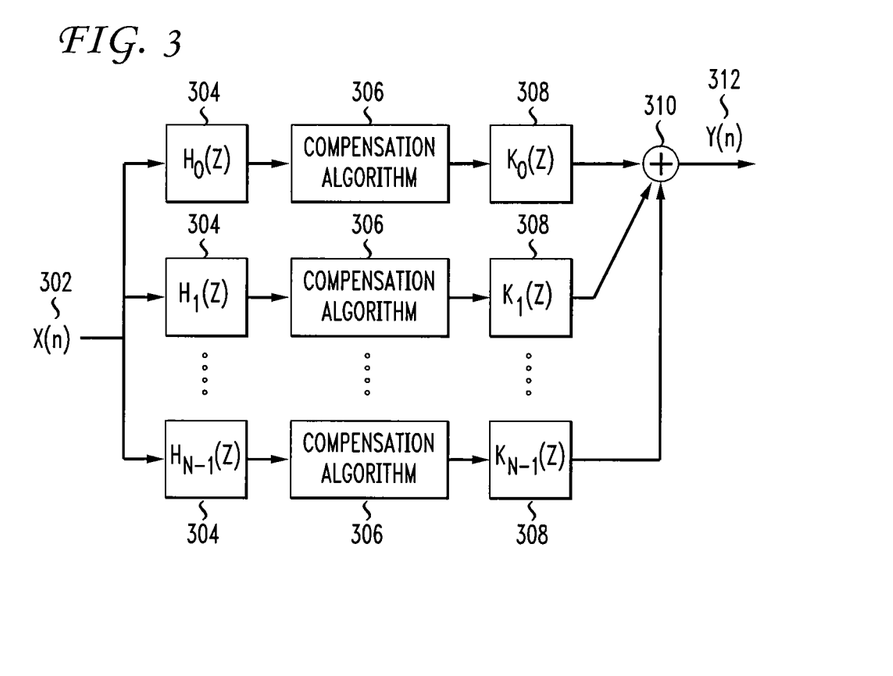
FIG. 3 shows a signal processing diagram for receiving a signal and compensating for frequency dependent imbalances which may be implemented by a processor.

FIG. 3 shows a signal processing diagram for receiving a signal and compensating for frequency dependent imbalances which may be implemented by a processor, for example, DSP 130 in accordance with an embodiment of the invention. A mixed I/Q wideband signal represented by X(n) 302 is received, where n represents the wideband signal in the time domain. The frequency sub-bands are extracted from X(n) 302 by filters ($H_0(z), H_1(z), \ldots, H_{N-1}(z)$), represented by blocks 304. A compensation algorithm is applied to each of the extracted frequency sub-bands at compensation algorithm blocks 306. The compensated sub-bands (at the output of filters $K_0(z), K_1(z), \ldots, K_{N-1}(z)$) are represented by blocks 308. The compensated sub-bands are then summed at adder 310 to produce a compensated signal represented by Y(n) 312. The design of the filters $H_i(z)$ and $K_i(z)$ referred to above is accomplished using principles of sub-band coding. In accordance with these well-known principles, the signal can be split and recombined without any distortion attributable to the processing. A well-known example of filters of this type is provided by so-called perfect reconstruction quadrature mirror filters.

In contrast to conventional methods that treat the problem of I/Q imbalances as a wideband problem, we extract the frequency sub-bands. By doing so, we can break the problem down into a narrowband problem applied individually to each frequency sub-band. Applying a compensation algorithm to each frequency sub-band and then summing the frequency sub-bands produces a signal that suffers from fewer imbalances than would result if the compensation algorithm were applied to the wideband signal only.

Any suitable compensation algorithm may be applied at compensation algorithm blocks 306. Frequency dependent algorithms are usually more complex than the frequency independent algorithms. As such, it is preferable to use frequency independent algorithms for those in 306. However, this does not preclude the use of frequency dependent algorithms. For example the compensation algorithm implemented by compensation algorithm blocks 306 may be an adaptive process designed to correct frequency independent imbalances. One suitable adaptive process derives blind signal separation parameters for use in image cancellation. Specifically, the adaptive process subtracts an interference estimate from a signal containing a desired signal component and an interference component. The adaptive process is discussed in greater detail in "Advanced Methods for I/Q Imbalance Compensation in Communications Receivers," Valkama et al., IEEE Transactions on Signal Processing, Vol. 49, No. 10, October 2001, pp. 2335-2344, incorporated by reference herein.

Another compensation algorithm designed to correct frequency independent imbalances employs a block estimation technique. This block estimation technique may be implemented at compensation algorithm block 306. Specifically, a block estimation technique is used to derive blind signal parameters for use in image cancellation, and is computationally efficient. The block estimation technique is advantageous because unknown analog imbalance parameters are estimated digitally without calibration or training signals. This block estimation technique is described in greater detail in "Blind I/Q Imbalance Parameter Estimation and Compensation in Low-IF Receivers," Windisch, M and Fettweis, G, Proc. 1st International Symposium on Control, Communications and Signal Processing, (ISCCSP 2004), Hammamet, Tunisia, March 2004, pp. 75-78, incorporated by reference herein. In block estimation, a block includes a group of N samples. Each block will have a different group of N samples that make up the block. For instance, a data block, denoted as block P, may have samples [x(N*P+1))] . . . [x(N*(P+1))]. Similarly, data block P+1 may have samples [x(N*(P+1))+1] . . . [x(N*(P+2))]. Accordingly, a single sample exists in one and only one block. Block estimation in this context means that any parameter estimation is done with only the samples in one block. The benefit is that the estimation process has no memory. Hence, the parameters if incorrectly chosen during block P are entirely forgotten by block P+1.

Some of the principles for constructing a perfect reconstruction quadrature mirror filter (PR-QMF) have been adopted from Rossi, Michel, Jin-Yun Zhang, and Willem Steenaart. "Iterative least squares design of perfect reconstruction QMF banks" In CAN CONF ELECTR COMPUT ENG, vol. 2, pp. 762-765, 1996. We begin with a M band filter bank and do not employ a decimation and interpolation factor. Contrary to the instant application, the decimation and interpolation factor is used in Rossi et al. in view of its desire to process speech at low rates. Accordingly, we set M equal to 1 and B bands for decomposition, where B does not equal M. In one example, B is set to 8. Writing the expression for Y(z) below, and using B instead of M gives:

$$Y(z) = \Sigma [H_m(z) F_m(z)] X(z)$$

$$m=0 \qquad\qquad\qquad\qquad\qquad\qquad\qquad B-1$$

The criteria that these be PR-QMFs require the output to be a delayed form of the input without any distortion. Hence, y(n)=x(n−n0) and leads to the design criteria for $H_m$ and $F_m$.

$$z^{-n0} = \Sigma [H_m(z) F_m(z)]$$

$$m=0 \qquad\qquad\qquad\qquad\qquad\qquad\qquad B-1$$

Continuing the design process for $H_m$ and $F_m$, cosine modulated filter banks are used where $H_m$ and $F_m$ are cosine modulated versions of a single linear phase low pass FIR filter, H(z) of order N. Advantageously, the aliasing between adjacent bands and phase distortion are completely cancelled. The generation of the cosine modulated filter banks is given below for $H_m$ and $F_m$. Here, we use B instead of M as specified in since no rate change is expected to occur in our design.

$$H_m(z) = \alpha_m H(ze^{-j\pi(m+0.5)/B}) + \alpha_m^* H(ze^{j\pi(m+0.5)/B})$$

$$F_m(z) = z^{-N} H_m(z^{-1})$$

$$\alpha_m = e^{j(\pi/4)(-1)^m} e^{-j\pi(m+0.5)N/2B}$$

In order to be a perfect reconstruction filter, the length of the prototype filter, N+1, must equal 2*q*B, where q is someinteger. M must be even which translates to B also being even.

A restriction on h(n), the prototype LPF, for perfect reconstruction is that $$2q-2m-1$$

$$\delta(m) = 2B\Sigma [h(n+rB)*h(n+rB+2mB)]$$

$$r=0$$

The previous equations have established the required structure of the decomposition and reconstruction filters. As can be seen special care must be exercised in the design of these filters. Namely, it involves a non-linear optimization problem in which an iterative least squares (ILS) approach where the miniziation function is iteratively approximated by a quadratic function.

While the aforementioned algorithms may be employed at the compensation algorithm block 306 shown in FIG. 3, it is to be understood that the compensation algorithm block is not limited to the implementation of these algorithms and may support any compensation algorithm suitable for compensating for I/Q imbalances in a direct down-conversion receiver. For example, compensation algorithms using a non-blind approach, such as a compensation algorithm that requires a calibration signal may also be implemented at compensation algorithm block 306. Thus, the calculation of signal parameters may also be performed with calibration and training signals.

Figure 4:
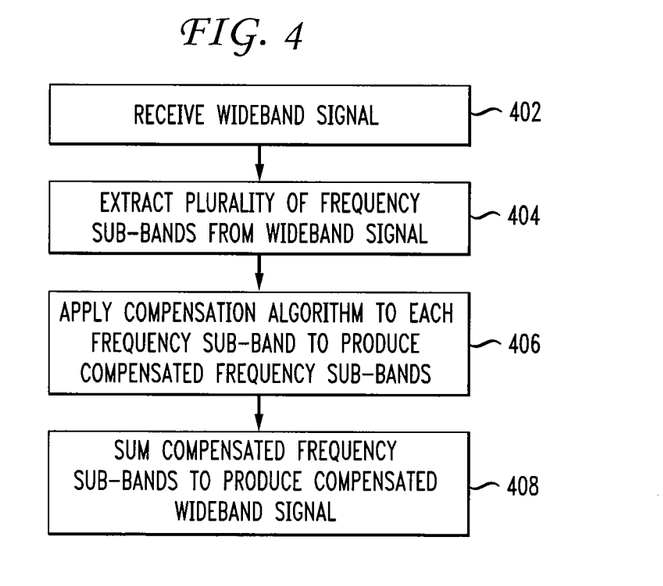
FIG. 4 shows a flowchart of a method for compensating for frequency dependent imbalances in accordance with an embodiment of the invention.

FIG. 4 is a flowchart of a method for compensating for frequency dependent imbalances in accordance with an embodiment of the invention. At step 402, an I/Q mixed wideband signal is received at a digital signal processor, such as DSP 130. At step 404, the I/Q mixed wideband signal, X(n) 302 is sent to a plurality of sub-band coders which each extract a frequency sub-band from the wideband signal represented by blocks 304. Each frequency sub-band is designed such that minimum signal distortion arises when the sub-bands are re-combined. The frequency sub-bands are extracted to allow a compensation algorithm to be applied to each frequency sub-band to remove imbalances by compensation algorithm blocks 306. At step 406, a compensation algorithm is applied to each of the frequency sub-bands by compensation algorithm blocks 306, thus producing an associated plurality of compensated frequency sub-bands represented by blocks 308. At step 408, the compensated frequency sub-bands are summed at adder 310 to produce a compensated wideband signal represented by Y(n) 312.

Figure 5A:
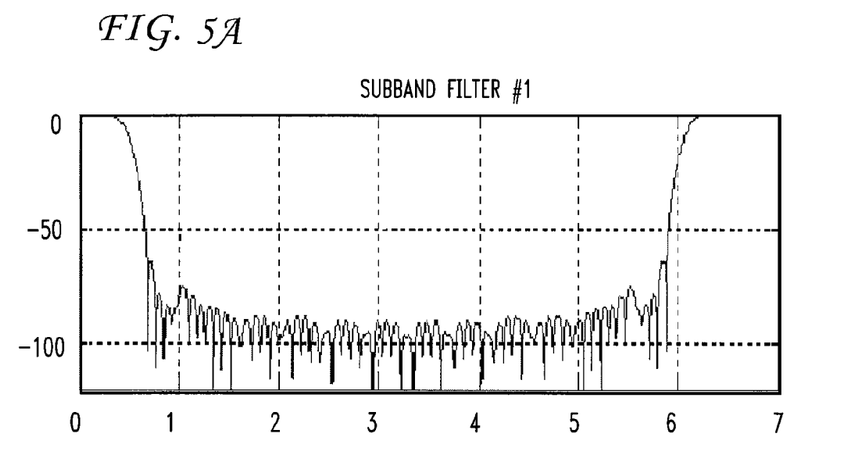
FIGS. 5A-5H each show exemplary filter responses to extract sub-bands from a wideband signal in accordance with an embodiment of the present invention.
Figure 5B:
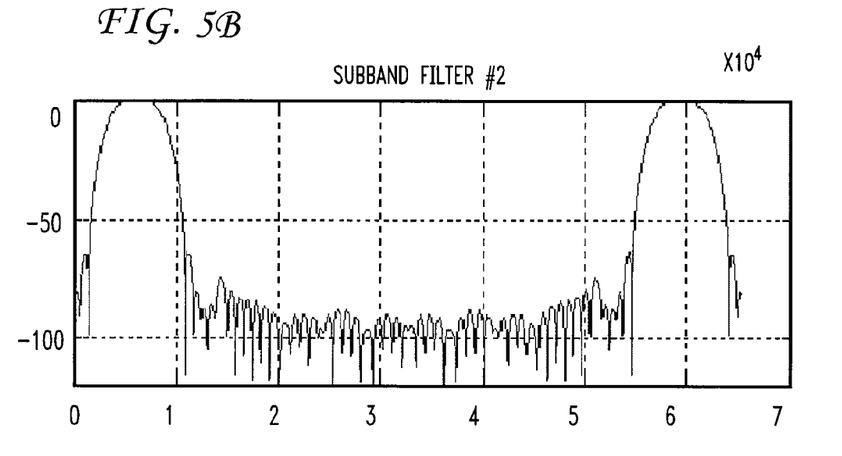
Figure 5C:
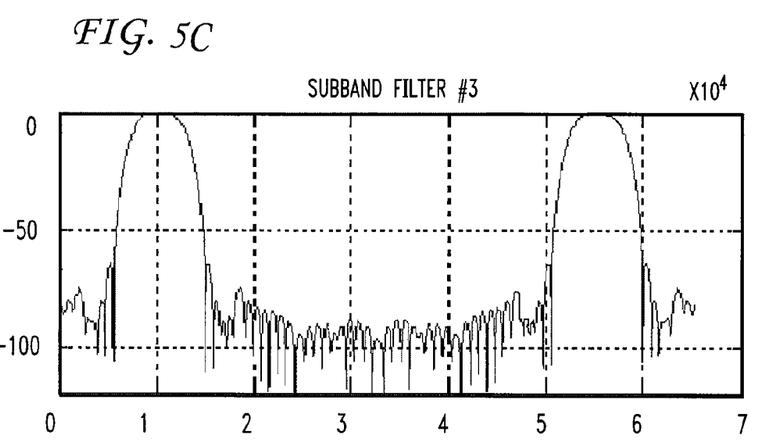
Figure 5D:
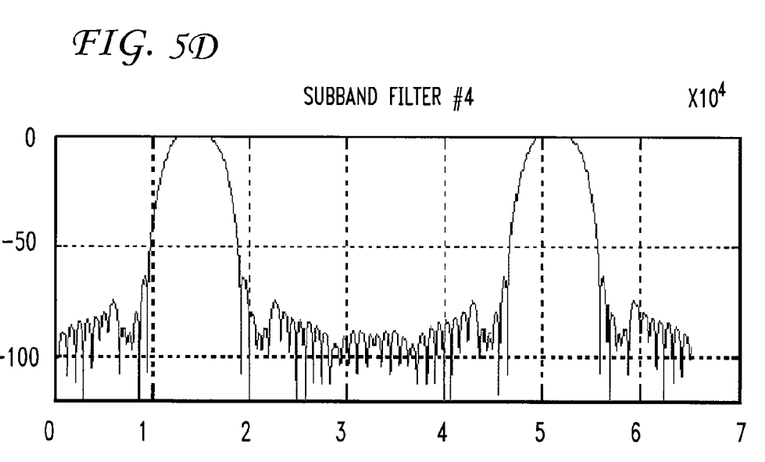
Figure 5E:
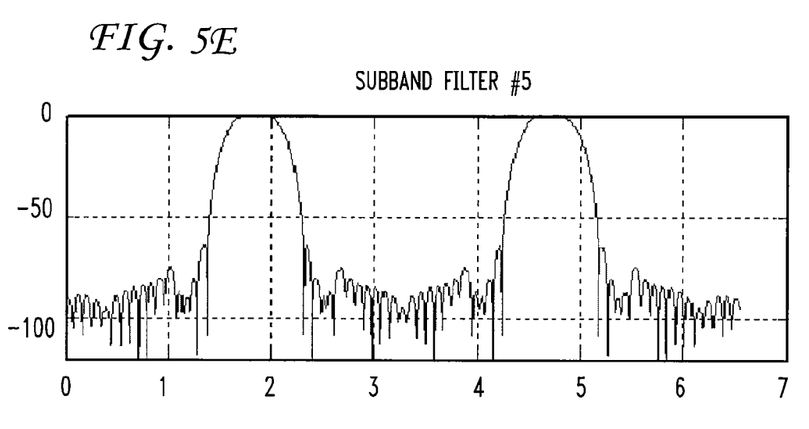
Figure 5F:
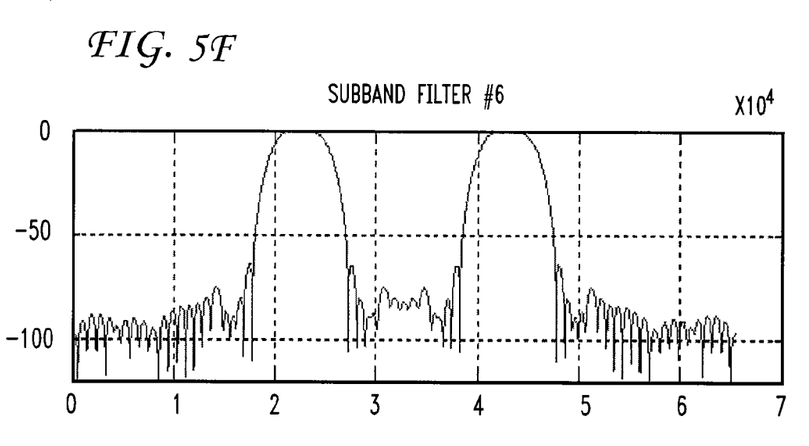
Figure 5G:
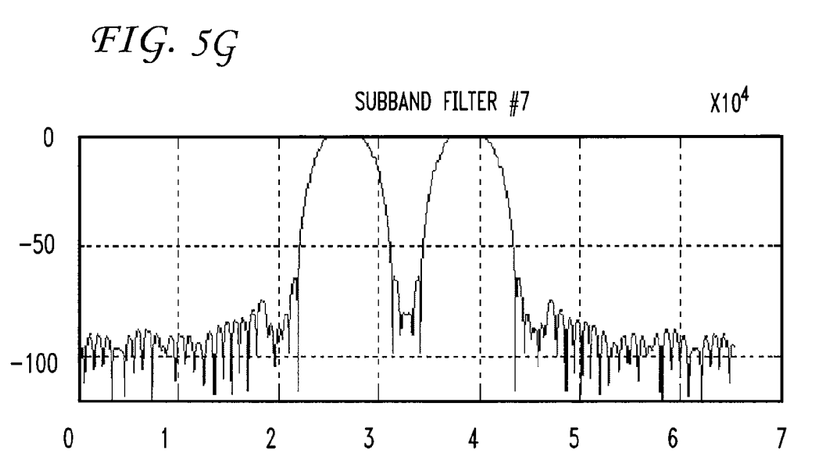
Figure 5H:
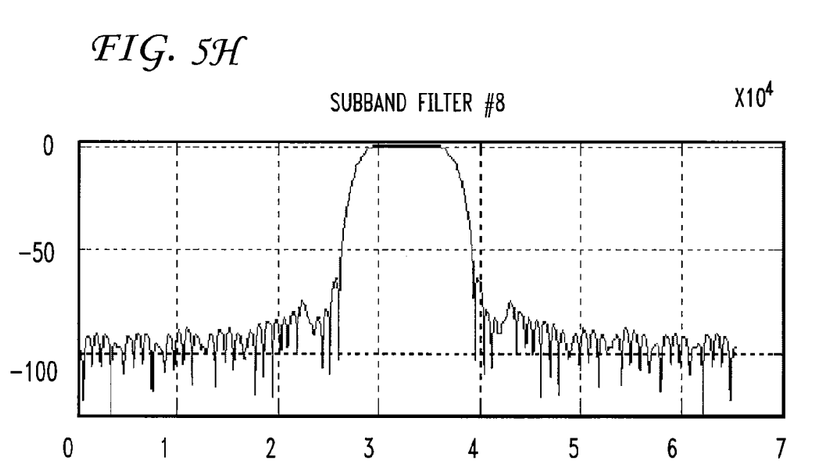

FIGS. 5A through 5H show exemplary filter responses to extract sub-bands from an I/Q mixed wideband signal. Specifically, each of FIGS. 5A through 5H corresponds with a frequency sub-band represented by blocks 304 extracted from an I/Q mixed wideband signal X(n) 302, as discussed above and shown in FIG. 3. For example, FIG. 5A may represent a frequency sub-band $H_0(z)$, discussed above. FIGS. 5B, 5C, 5D, 5E, 5F, and 5G may represent frequency sub-bands shown $H_1(z)$, $H_2(z)$, $H_3(z)$, $H_4(z)$, $H_5(z)$, and $H_6(z)$, respectively. FIG. 5H may represent a frequency sub-band $H_{N-1}(Z)$. While eight exemplary representations of frequency sub-bands are shown, any number of blocks 304 may be employed to output any number of corresponding frequency sub-bands.

Figure 6A:
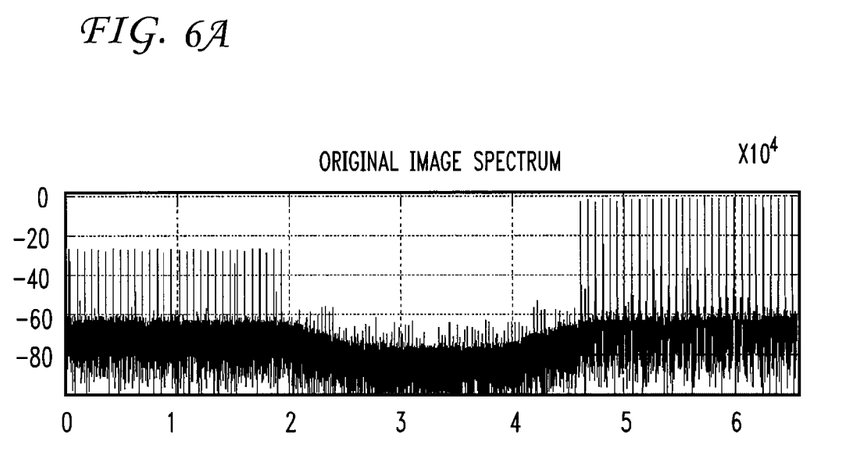
FIG. 6A shows an exemplary original image spectrum received at a direct down-conversion receiver.
Figure 6B:
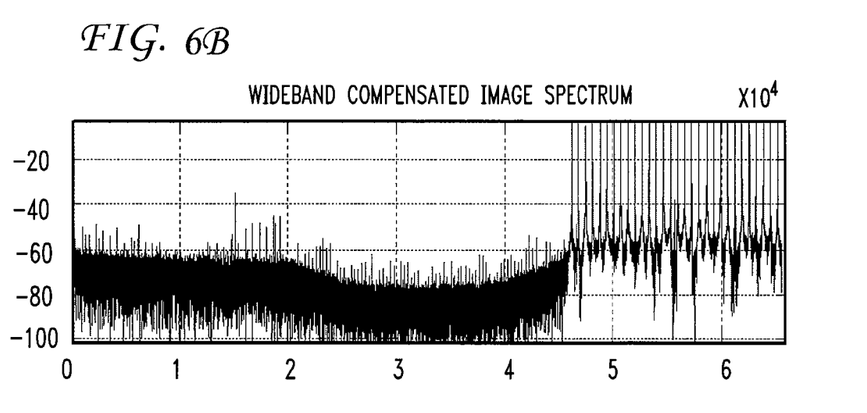
FIG. 6B shows an exemplary wideband compensated image spectrum of an I/Q mixed wideband signal after applying a frequency independent compensation scheme.
Figure 6C:
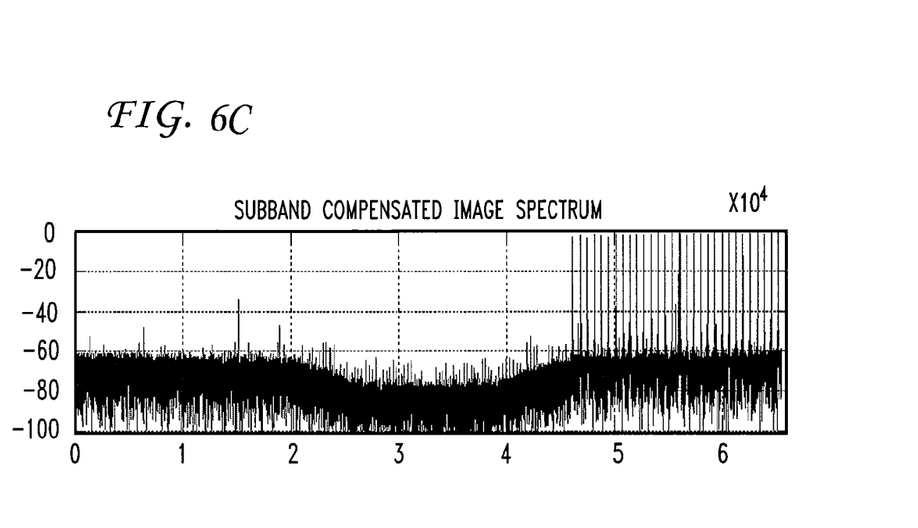
FIG. 6C shows a frequency spectrum of an I/Q mixed wideband signal after applying a compensation algorithm to each frequency sub-band and summing the compensated frequency sub-bands in accordance with an embodiment of the present invention.

FIGS. 6A through 6C show the original image spectrum corresponding respectively to: a signal received at a receiver, a wideband compensated image spectrum of an I/Q mixed wideband signal obtained after applying a compensation algorithm, and a frequency sub-band compensated image spectrum of the I/Q mixed wideband signal obtained after applying a compensation algorithm to each frequency sub-band and summing the compensated frequency sub-bands.

FIG. 6A shows the original image spectrum of a signal received at a receiver. FIG. 6B shows a wideband compensated image spectrum of the I/Q mixed wideband signal assuming a compensation algorithm had been applied to the entire wideband signal. Due to the frequency dependent nature of the wideband environment, certain frequencies show image energy at −45 dB whereas others are attenuated down to at least −60 dB.

A great amount of imbalance exists and can be seen when comparing FIGS. 6A and 6B. FIG. 6C shows a frequency sub-band compensated image spectrum of a compensated wideband signal after extracting frequency sub-bands from the I/Q mixed wideband signal, applying a compensation algorithm to each frequency sub-band, and summing the frequency sub-bands to produce the compensated wideband signal. Using the sub-band approach described within this document, all images were reduced to at least −60 dB.

Figure 7:
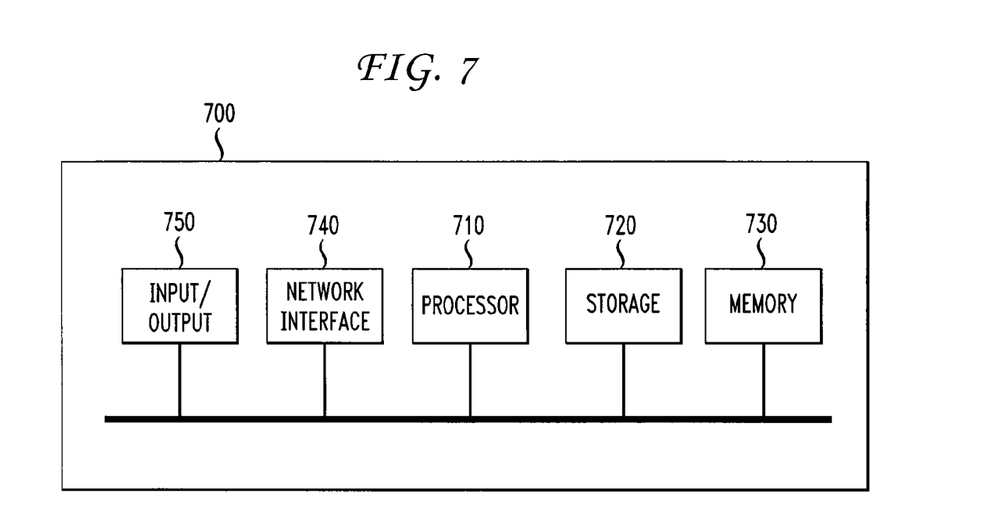
FIG. 7 shows a processor which may be used to implement certain embodiments of the present invention described herein.

The above-described methods for compensating for frequency dependent imbalances can be implemented on a computer using well-known computer processors, memory units, storage devices, computer software, and other components. A high-level block diagram of such a computer is illustrated in FIG. 7. Computer 700 contains a processor 710 which controls the overall operation of computer 700 by executing computer program instructions which define such operations. The computer program instructions may be stored in a storage device 720, or other computer readable medium (e.g., magnetic disk, CD ROM, etc.), and loaded into memory 730 when execution of the computer program instructions is desired.

Thus, the method steps of FIG. 4 can be defined by the computer program instructions stored in the memory 730 and/or storage 720 and controlled by the processor 710 executing the computer program instructions. For example, the computer program instructions can be implemented as computer executable code programmed by one skilled in the art to perform an algorithm defined by the method steps of FIG. 4. Accordingly, by executing the computer program instructions, the processor 710 executes an algorithm defined by the method steps of FIG. 4.

While computer 700 has been described as being used for compensating for frequency dependent imbalances in a signal in accordance with the method steps shown in FIG. 4, computer 700 may also perform functionalities related to those described above in connection with the other Figures. Computer 700 also includes one or more network interfaces 740 for communicating with other devices via a network. Computer 700 further includes input/output devices 750 that enable user interaction with the computer 700 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the embodiments disclosed herein is not to be determined from the Detailed Description, but rather from the claims as interpreted according to the full breadth permitted by the patent laws. It is to be understood that the embodiments shown and described herein are only illustrative of the principles of the present embodiments and that various modifications may be implemented by those skilled in the art without departing from the scope and spirit of the embodiments described herein. Those skilled in the art could implement various other feature combinations without departing from the scope and spirit of the embodiments of the present disclosure.

I claim:

1. A method for compensating for frequency dependent imbalances comprising:
    extracting a plurality of frequency sub-bands from a received wideband signal;
    compensating each of the plurality of frequency sub-bands to produce an associated plurality of compensated frequency sub-bands, wherein compensating each of the plurality of frequency sub-bands comprises:
        deriving blind signal separation parameters via a block estimation technique for each of the plurality of frequency sub-bands, wherein the blind signal separation parameters represent unknown imbalance parameters digitally estimated without training signals; and
        removing an interference component from each of the plurality of frequency sub-bands based on the blind signal separation parameters; and
    summing, by a processor, the compensated frequency sub-bands to produce a compensated signal.

2. The method of claim 1, wherein extracting a plurality of frequency sub-bands is performed by a sub-band coder.

3. The method of claim 1, wherein the step of compensating is performed by a frequency dependent algorithm.

4. The method of claim 1, wherein the step of compensating is performed by a frequency independent algorithm.

5. A system for compensating for frequency dependent imbalances comprising:
    means for extracting a plurality of frequency sub-bands from a received wideband signal;
    means for compensating each of the plurality of frequency sub-bands to produce an associated plurality of compensated frequency sub-bands, wherein the means for compensating each of the plurality of frequency sub-bands comprises:
        means for deriving blind signal separation parameters via a block estimation technique for each of the plurality of frequency sub-bands, wherein the blind signal separation parameters represent unknown imbalance parameters digitally estimated without training signals; and
        means for removing an interference component from each of the plurality of frequency sub-bands based on the blind signal separation parameters; and
    means for summing the compensated frequency sub-bands to produce a compensated signal.

6. The system of claim 5, wherein the means for extracting a plurality of frequency sub-bands is a sub-band coder.

7. The system of claim 5, wherein the means for compensating each of the plurality of frequency sub-bands comprises:
    means for applying a frequency dependent algorithm.

8. The system of claim 5, wherein the means for compensating each of the plurality of frequency sub-bands comprises:
    means for applying a frequency independent algorithm.

9. A processor for compensating for frequency dependent imbalances comprising:
    a plurality of sub-band coders configured to extract an associated plurality of frequency sub-band from a received wideband signal;
    a plurality of compensation algorithm blocks configured to compensate each of the plurality of frequency sub-bands to produce an associated plurality of compensated frequency sub-bands, wherein each compensation algorithm block derives blind signal separation parameters via a block estimation technique for each of the plurality of frequency sub-bands and removes an interference component from each of the plurality of frequency sub-bands based on the blind signal separation parameters, wherein the blind signal separation parameters represent unknown imbalance parameters digitally estimated without training signals; and an adder configured to sum the compensated frequency sub-bands to produce a compensated signal.

10. The processor of claim 9, wherein each of the plurality of compensation algorithm blocks is configured to implement a frequency dependent algorithm.

11. The processor of claim 9, wherein each of the plurality of compensation algorithm blocks is configured to implement a frequency independent algorithm.

12. The method of claim 2, wherein the sub-band coder is a perfect reconstruction quadrature mirror filter.

13. The system of claim 6, wherein the sub-band coder is a perfect reconstruction quadrature mirror filter.

14. The processor of claim 9, wherein each sub-band coder is a perfect reconstruction quadrature mirror filter.

15. The method of claim 1, wherein a compensated image of the compensated signal is reduced to at least −60 dB with an unaffected noise floor.

16. The method of claim 15, wherein 8 or fewer subbands are extracted from the received wideband signal.

* * * * *